United States Patent
Yaker

(10) Patent No.: US 7,974,276 B2
(45) Date of Patent: Jul. 5, 2011

(54) SYSTEM AND METHOD FOR PROVIDING ADVANCED CALLING FEATURES TO A PACKET NETWORK-BASED COMMUNICATION DEVICE AND PACKET NETWORK EMPLOYING THE SAME

(75) Inventor: Rhoda Yaker, Annandale, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1533 days.

(21) Appl. No.: 10/411,759

(22) Filed: Apr. 11, 2003

(65) Prior Publication Data

US 2004/0008621 A1    Jan. 15, 2004

Related U.S. Application Data

(62) Division of application No. 09/027,842, filed on Feb. 23, 1998, now Pat. No. 6,594,230.

(51) Int. Cl.
*H04L 12/28* (2006.01)
(52) U.S. Cl. ...................................... 370/389
(58) Field of Classification Search .................. 370/221, 370/351, 389, 352, 353, 354; 379/201.02, 379/210.02, 265, 266, 142, 212, 127, 201, 379/210
See application file for complete search history.

(56) References Cited

U.S. PATENT DOCUMENTS

| | | | | |
|---|---|---|---|---|
| 5,915,008 | A * | 6/1999 | Dulman | 379/221.08 |
| 6,173,044 | B1 * | 1/2001 | Hortensius et al. | 379/93.09 |
| 6,463,276 | B1 * | 10/2002 | Jonsson | 455/410 |
| 2003/0067908 | A1 * | 4/2003 | Mattaway et al. | 370/352 |

FOREIGN PATENT DOCUMENTS

| | | |
|---|---|---|
| JP | 62-068353 | 3/1987 |
| JP | 09-130428 | 5/1997 |
| JP | 10-004454 | 1/1998 |
| JP | 10-4451 | 10/1998 |

* cited by examiner

*Primary Examiner* — Kevin C Harper
*Assistant Examiner* — Henry Baron
(74) *Attorney, Agent, or Firm* — Hitt Gaines, PC

(57) ABSTRACT

For use with a user communication device (UCD) that communicates over a packet network by alternately transmitting and receiving streams of associated continuous media communication data packets, systems and methods for providing call processing features, such as call forwarding and call blocking, to the communication device. In one advantageous embodiment of the present invention, the call processing system: (1) determines that a call composed of a stream of continuous media communication packets and associated with the UCD requires a specified alternative processing and (2) causes the continuous media communication data packets associated with the call to be processed in accordance with the specified alternative processing.

14 Claims, 5 Drawing Sheets

SYSTEM AND METHOD FOR PROVIDING ADVANCED CALLING FEATURES TO A PACKET NETWORK-BASED COMMUNICATION DEVICE AND PACKET NETWORK EMPLOYING THE SAME

This Application is a Divisional of prior application Ser. No. 09/027,842, filed Feb. 23, 1998, now U.S. Pat. No. 6,594,230, to Rhoda Yaker. The above-listed Application is commonly assigned with the present invention and is incorporated herein by reference as if reproduced herein in its entirety under Rule 1.53(b).

TECHNICAL FIELD OF THE INVENTION

The present invention is directed, in general, to telecommunications and, more specifically, to a system and method for providing advanced calling features, such as call forwarding and call blocking, to a packet network-based telephone, such as an Internet telephone, and a packet network that employs the system or the method.

BACKGROUND OF THE INVENTION

Call forwarding and call blocking are well known telephony services provided to subscribers by a local exchange carrier in circuit switched networks. Traditionally, call forwarding allows a subscriber (or user) selectively to "program" an incoming call to be forwarded to another communication device; call blocking, on the other hand, prevents an incoming or outgoing call from being completed.

As previously mentioned, call forwarding is a generally recognized calling feature provided in circuit switched networks and, as such, has been the subject of many prior art references. For instance, U.S. Pat. No. 5,027,384, entitled "Personalized Automatic Call Routing," by Sanford J. Morganstein, issued on Jun. 25, 1991, which is incorporated herein by reference, discloses a system where the subscriber can preprogram the communication system to provide personalized voice responses and alternate destinations to assist the calling party in completing the call. Additionally, U.S. Pat. No. 5,442,691, entitled "Method and Apparatus for Call Routing in Switched Digital Networks Using Call Control Tables," by Steven Price, et al., which is incorporated herein by reference, provides tables of call control information to facilitate the routing of calls in a switched digital network.

Regarding call blocking features, call blocking features have also been the subject of prior art references. For instance, U.S. Pat. No. 5,467,388, entitled "Method and Apparatus for Selectively Blocking Incoming Telephone Calls," by James C. Reed, et al., issued on Nov. 14, 1995, which is incorporated herein by reference, discloses a system that allows a subscriber to selectively block incoming calls for selected time periods or during programmed time intervals to screen out unwanted calls from a particular caller or location. Obviously, the aforementioned U.S. patents are only examples of references directed to telephony services in circuit switched networks.

Internet telephony applications are becoming an attractive alternate for conventional telephony services, primarily because of the promise of substantial reduction in communication costs. There are currently no long-distance charges associated with Internet telephony. Furthermore, there are a large number of applications and new multimedia capabilities available on the World Wide Web. The Internet "telephone" with a computing device, e.g., a personal computer, often employing a packet-based technology, provides the caller with a greater flexibility and control as opposed to the traditional telephone devices.

SUMMARY OF THE INVENTION

I have recognized that communication networks employing a packet-based technology, e.g., the Internet, provide challenges not readily apparent in circuit switched networks. For instance, the dynamic addressing techniques employed in packet networks are very different than the routing strategies employed in circuit switched networks. As a result, applying call forwarding and call blocking features to packet networks involves call processing techniques not presently available. The present invention provides, for use with a user communication device (UCD) that communicates over a packet network, such as an Internet telephone, systems for providing call processing features (e.g., call forwarding or call blocking) to the UCD. The present invention therefore adapts call processing techniques employed in circuit switching systems to packet-based networks. In one embodiment, the present invention: (1) determines that a call composed of a stream of continuous media communication packets and associated with the UCD requires a specified alternative processing and (2) causes the continuous media communication data packets associated with the call to be processed in accordance with the specified alternative processing.

The call forwarding system or the call blocking system may be directly connectible with the UCD or may be directly connectible with a point of presence (POP) of the packet network (such as an Internet Service Provider, or ISP). "Directly connectible," for purposes of the present invention, is defined as being directly associated with or a part of For example, one or both of the systems may be in a user's telephone or computer UCD. One or both of the systems may be at the user's ISP, such that they may operate even when the user's UCD is not connected to the packet network.

In one embodiment, the call forwarding system stores call forwarding criteria and forwards incoming calls based on the call forwarding criteria. In one embodiment, the call blocking system receives information pertaining to a potential call with another party and blocks completion of the potential call based on a comparison of stored call blocking criteria with the information.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
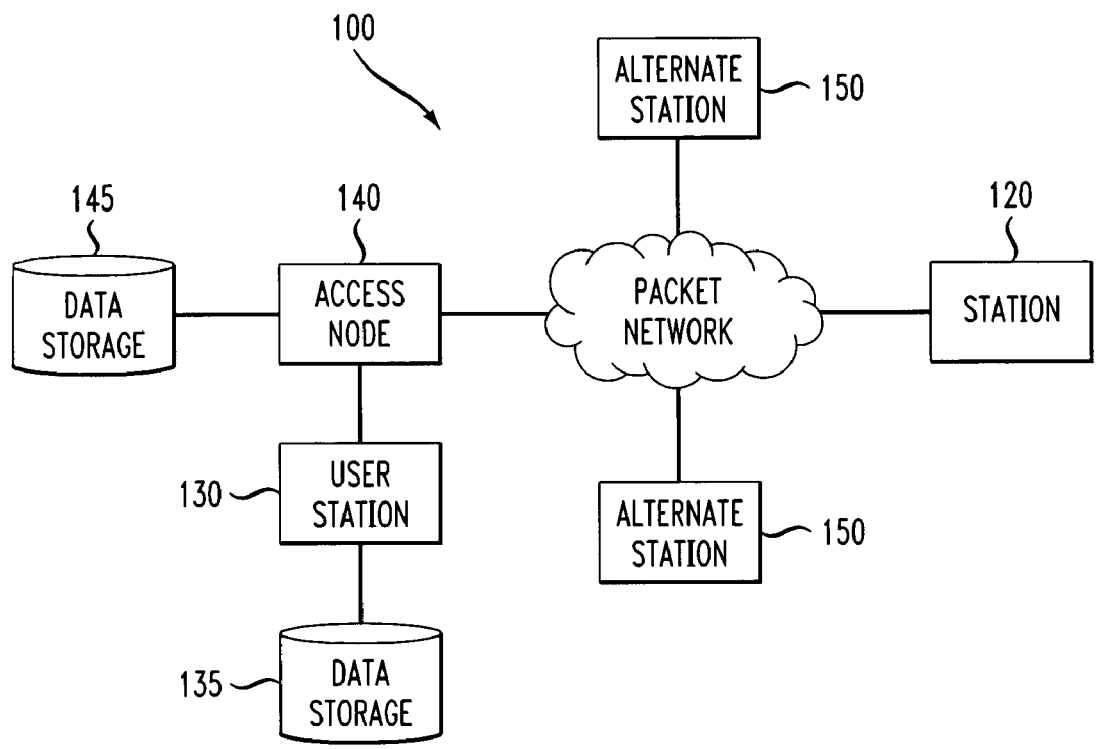
FIG. 1 illustrates an embodiment of a packet network providing an environment for a system constructed according to the principles of the present invention.

Referring initially to FIG. 1, illustrated is an embodiment of a packet network, generally designated 100, providing an environment for a system constructed according to the principles of the present invention. The packet network 100, e.g., the Internet, facilitates the transmission of data in the form of data packets, or datagrams, between a user station and a single station, in the case of a unicast, or between a user station and a plurality of stations, as with a multicast. The packet network 100 includes a user station 130, typically a processor, such as a personal computer (PC), that is coupled to a data storage device 135, e.g., an external hard disk. The system of the present invention is not limited for use with a data storage device such as external physical devices or even the presence of such devices physically connected to the user station 130. The system of the present invention contemplates that the user station 130 is able to access a data storage device at either the user station 130 or at a remote location, or both.

The user station 130 is also coupled to an access node 140, or point of presence (POP), that provides a gateway to the packet network 100. The access node 140 may be a packet network service provider, such as an Internet service provider (ISP), and is shown coupled to a data storage device 145 analogous to the data storage device 135. The presence of the access node 140 is not necessary to the practice of the present invention as the user station 130 is equipped to communicate directly to the packet network 100 without requiring an intermediate interface. A station 120 and a plurality of alternate stations 150 are also coupled to the packet network 100. The station 120 and the plurality of alternate stations 150 are typically user communication devices (UCDs), such as packet telephones, voice mailboxes, or pagers.

The user station 130 communicates with the station 120 or alternate stations 150 by sending data packets via the packet network 100. Further information about packet network architectures and transmission of data packets may be found in "Data Network Design," by Darren L. Spohn, McGraw-Hill, Inc. (1993), which is incorporated herein by reference.

Figure 2:
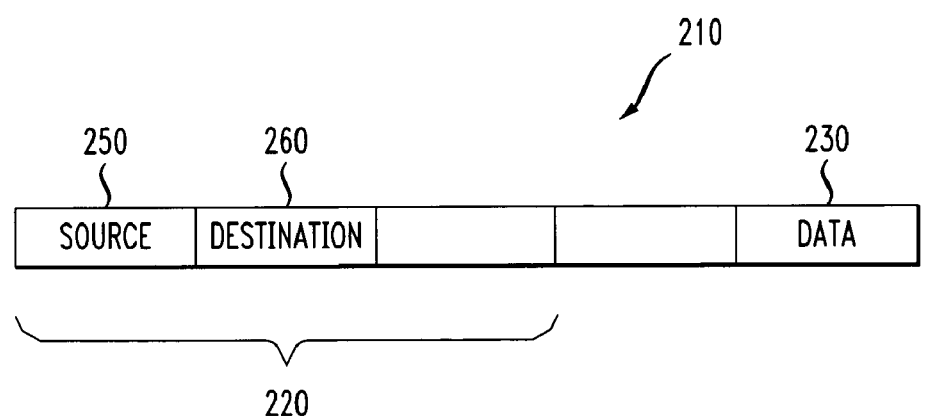
FIG. 2 illustrates an embodiment of a data packet assembled according to the present invention.

Turning now to FIG. 2, illustrated is an embodiment of a continuous media communication data packet 210 assembled according to the present invention. The data packet 210, e.g., an Internet Protocol (IP) packet, includes a header 220, data 230 and other information, such as an identifier or options associated with the data packet. Included in the header 220 are source 250 and destination 260 information. The data packets 210 contain complete addressing information and may be split, or fragmented, into smaller packets. The fragmentation of the data packets 210 will permit a large data packet to travel across a packet network which can only handle smaller data packets.

It is not necessary that the source and destination information 250, 260 be contained only in the header 220 of the data packet 210; the source and destination information 250, 260 may also reside in other locations within the data packet 210. Furthermore, the source and destination information 250, 260 may include not only the addresses of the source and destination, but also other identifiers, such as the identity of individual at the source or destination, or both.

Figure 3:
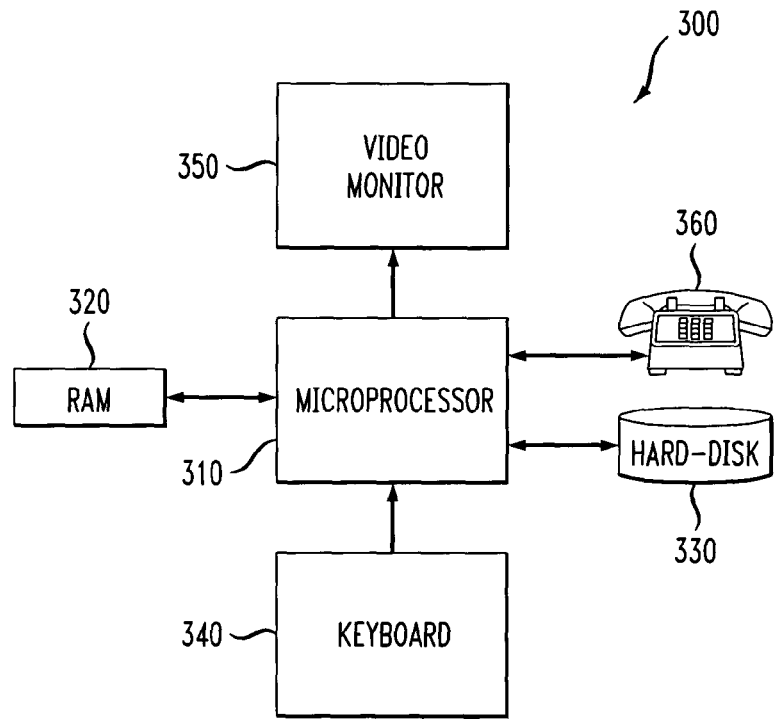
FIG. 3 illustrates a block diagram of an exemplary computer providing an environment within which the system of present invention may be employed and implemented.

Turning now to FIG. 3, illustrated is a block diagram of an exemplary computer, generally designated 300, providing an environment within which the system of present invention may be employed and implemented. The computer 300 includes processing circuitry 310, e.g., having at least one conventional processor, conventional volatile memory 320, e.g., random access memory, non-volatile memory 330, e.g., a hard disk drive, and a UCD 360. The UCD 360 may be separate devices, such as a microphone, speakers and associated voice encoding and decoding software, or a conventional telephone that has been adapted for use with the present invention. The processing circuitry 310, volatile memory 320 and non-volatile memory 330 are associated with each other and cooperatively operate to execute the system of the present invention. The computer 300 may further include an input/output device 340, such as a keyboard, and a display device 350, such as a video monitor. The keyboard may be used to control the execution of the process associated with the system of the present invention in the computer 300, and a video monitor may be used to view the results thereof.

The principles of the present invention are not limited to a particular processing environment, but may be implemented in any processing system architecture, including, without limitation, microcomputers, e.g., personal computers, and main-frame computers. Conventional processing system architecture is discussed in "Computer Organization and Architecture," by William Stallings, MacMillan Publishing Co. (3rd ed. 1993), which is incorporated herein by reference, and conventional processing system network design is discussed in "Data Network Design," by Darren L. Spohn, McGraw-Hill, Inc. (1993).

In one embodiment of the present invention, a system for providing a call blocking feature is embodied in a sequence of instructions executable in the computer 300. The call blocking process includes a packet interception routine that monitors a particular user station for outgoing or incoming calls. Upon detection of a call, incoming or outgoing, the packet interception routine then determines the identity of the calling and called parties and provides this information to a call blocking routine. The call blocking routine proceeds to decide if the call, incoming or outgoing, should be terminated based on the information provided by the packet interception routine. A more specific embodiment of the packet interception routine and the call blocking routine will be described with respect to FIGS. 4 and 5.

In another embodiment of the present invention, a system for providing a call forwarding feature is embodied in a sequence of instructions executable in the computer 300. The call forwarding routine receives an incoming call and determines the identity of the calling and called parties. The call forwarding routine provides the identities of the calling and called parties to a call forwarding criteria routine that compares the provided information to entries in a call forwarding directory. The call forwarding directory contains routing information associated with calling entities and provides alternate destinations to the call forwarding routine, to complete the incoming call. A more specific embodiment of the call forwarding routine and the call forwarding criteria routine will be described with respect to FIGS. 6 and 7. Those skilled in the art understand, however, that the foregoing embodiments and the systems of the present invention, in general, may also be implemented in hardware, firmware, software, or any combination thereof.

Figure 4:
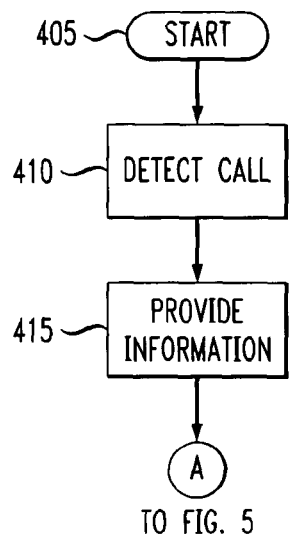
FIG. 4 illustrates a flow chart of an embodiment of a packet interception routine according to the principles of the present invention.

Turning now to FIG. 4, illustrated is a flow chart of an embodiment of a packet interception routine according to the principles of the present invention. The process begins at a start step 405 with an access node monitoring a packet network and user station for any outgoing or incoming calls. At a detect call step 410, the access node detects a call. Outgoing calls from the user station are usually detected when the user station requests a connection to the packet network. Similarly, incoming calls are usually detected when data packets are received at a station serving as the destination. Upon detection of a call, incoming or outgoing, source and destination information contained in the header of the data packets are extracted and the data packets are placed in a buffer, e.g., a memory device associated with the access node, pending a request from the call blocking routine to transmit the data packets. The extracted source and destination information are then provided, at a provide information step 415, to the call blocking routine.

Figure 5:
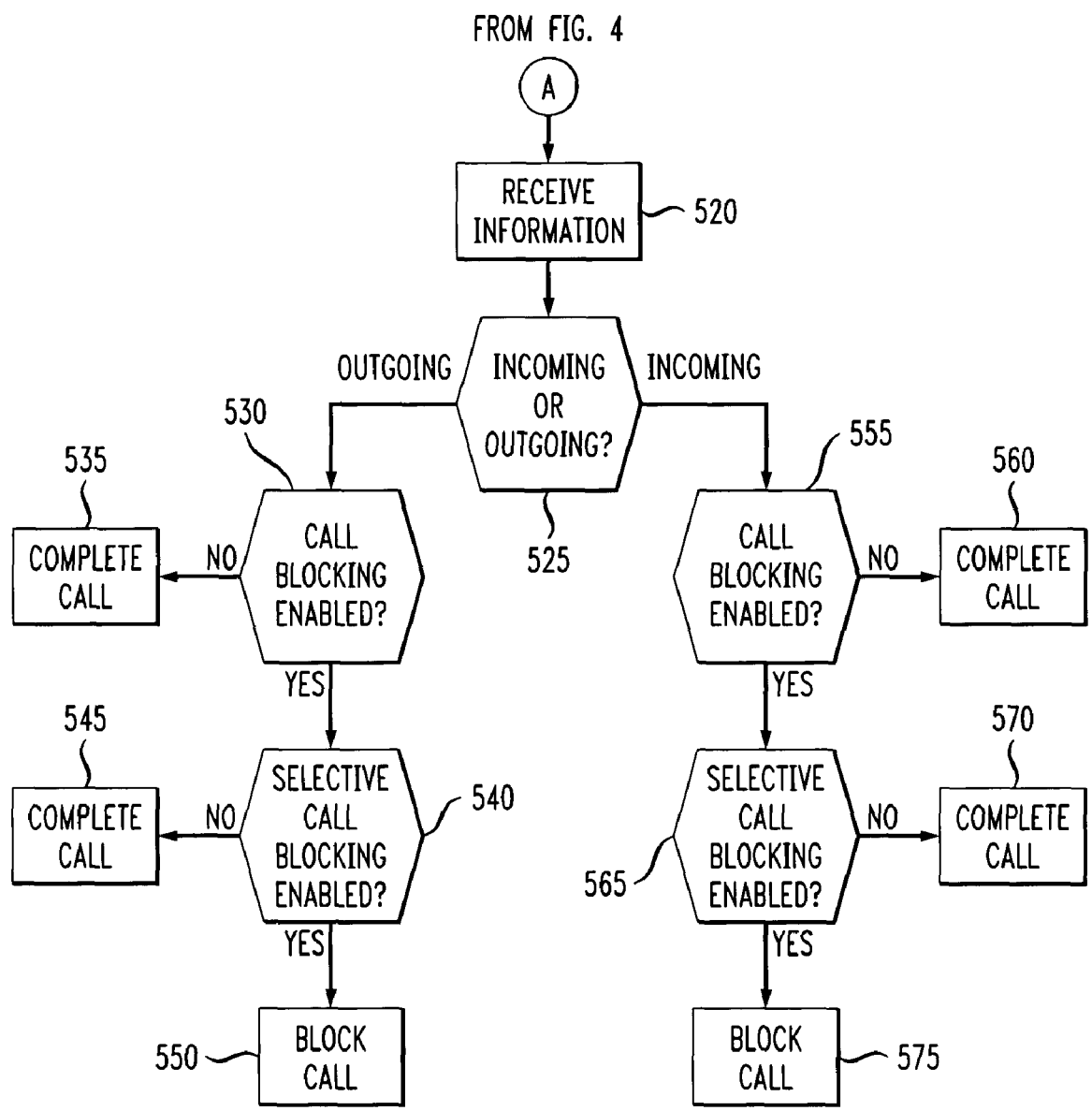
FIG. 5 illustrates a flow chart of an embodiment of a call blocking routine according to the principles of the present invention.

Turning now to FIG. 5, illustrated is a flow chart of an embodiment of a call blocking routine according to the principles of the present invention. The call blocking routine is initiated, at a receive information step 520, with the acceptance of the source and destination information of the data packets. At an incoming or outgoing decisional step 525, it is determined whether the call is an incoming or outgoing call. This is accomplished by comparing the source identifier with the station identifier. If the source and station identifiers are the same, the call is an outgoing call.

If the determination at the incoming or outgoing step 525 is that the call is an outgoing call, control passes to a call blocking enabled decisional step 530 to determine if call blocking is enabled for the calling station. The determination of whether call blocking is enabled may be accomplished by accessing a particular memory location, which may be associated with an enable flag or other identifier, which would determine if the bit has been set, i.e., a logic "1". If call blocking has not been enabled, the call blocking routine, at a complete call step 535, transmits a request to the access node to release the buffered data packets and complete the connection.

If it is determined at the call blocking enabled step 530, however, that call blocking is enabled, control passes to a selective call blocking enabled decisional step 540 to determine if selective call blocking has been activated for the called station, i.e., destination, by comparing the called station with a call blocking criteria that has been preestablished. Selective call blocking is to distinguish from the call blocking enabled at step 530. The call blocking enabled decisional step 530 determines if the call blocking feature has been activated for the calling station whereas selective call blocking determines if calls to the called station is to be blocked. The station user generally creates call blocking control entries that may be used by the application programs running at the local station processor, the access node processor, the remote processors accessed through the packet network or any stations of the packet network which are connected to the remote processors. An outgoing call blocking directory may be created with each entry comprising a name of a specific destination and associated call blocking control information. An example of a call control table is disclosed in Steven Price, et al. The destinations in the outgoing call blocking directory table may include, for instance, the continuous media communication data packet source address, the continuous media communication data packet destination address, the identity of the calling party, the automatic number information (ANI) associated with the call and the identity of the called party. The call blocking control information may include a time period, such as a day of week or time of day, when calls to the associated destinations of the call blocking control information are not to be completed, i.e., blocked.

To illustrate, a station user, e.g., Mother with child A and child B, may define the call blocking directory whereby calls initiated by Mother are never block and calls to predetermined destinations initiated by child A or child B are selectively blocked depending on the call blocking control information associated with each child. The identification of the current station user, e.g., Mother, child A or child B, may be accomplished with a "logon" procedure using identifiers, such as user I.D. and passwords. Also, passwords or identifiers may be employed to prevent the unauthorized additions and deletions to the call blocking directory. Additionally, both static and dynamic call blocking directory tables may be employed. In the former, all the entries are fully defined before the initiation of any calls. In the latter, destinations and call blocking control information may be added and deleted dynamically or alternatively may be enabled or disabled, as required and not only before calls are initiated. The table entries are the call blocking criteria used at the selective call blocking enabled step 540 to determine if call blocking has been activated for the called station.

If at the selective call blocking enabled step 540, it is determined that selective call blocking for that particular destination has not been enabled or does not exist, the call blocking routine, at a complete call step 545, transmits a request to the access node to release the buffered data packets and complete the connection. However, if at the selective call blocking enabled step 540, it is determined that selective call blocking for that particular destination has been enabled, the call blocking routine, at a block call step 550, transmits a request to the access node to discard the buffered data packets and deny the station access to the packet network.

Returning to the incoming or outgoing step 525, if it is determined that the call is an incoming call, control passes to a call blocking enabled decisional step 555 to determine if call blocking is enabled for the called station. The determination of whether call blocking is enabled may be accomplished by accessing a particular memory location, which may be associated with an enable flag or other identifier, which would determine if the bit has been set, i.e., a logic "1". If call blocking has not been enabled, the call blocking routine, at a complete call step 560, transmits a request to the access node to release the buffered data packets and complete the connection.

If it is determined at the call blocking enabled step 555, however, that call blocking is enabled, control passes to a selective call blocking enabled decisional step 565 to determine if selective call blocking has been activated for the calling station, i.e., source, by comparing the calling station with the call blocking criteria that has been preestablished. Selective call blocking is to distinguish from the call blocking enabled at step 555. The call blocking enabled decisional step 555 determines if the call blocking feature has been activated for the called station whereas selective call blocking determines if calls from the calling station is to be blocked. An incoming call blocking directory, similar to the outgoing call blocking directory described previously, is defined by the station user with entries corresponding to specific sources and associated call blocking control information.

If at the selective call blocking enabled step 565, it is determined that selective call blocking for that particular destination has not been enabled or does not exists, the call blocking routine, at a complete call step 570, transmits a request to the access node to release the buffered data packets and complete the connection. If at the selective call blocking enabled step 565, however, it is determined that selective call blocking for that particular destination has been enabled, the call blocking routine, in a block call step 575, transmits a request to the access node to discard the buffered data packets and ignore, i.e., do not transmit, data packets from that source to the station.

Figure 6:
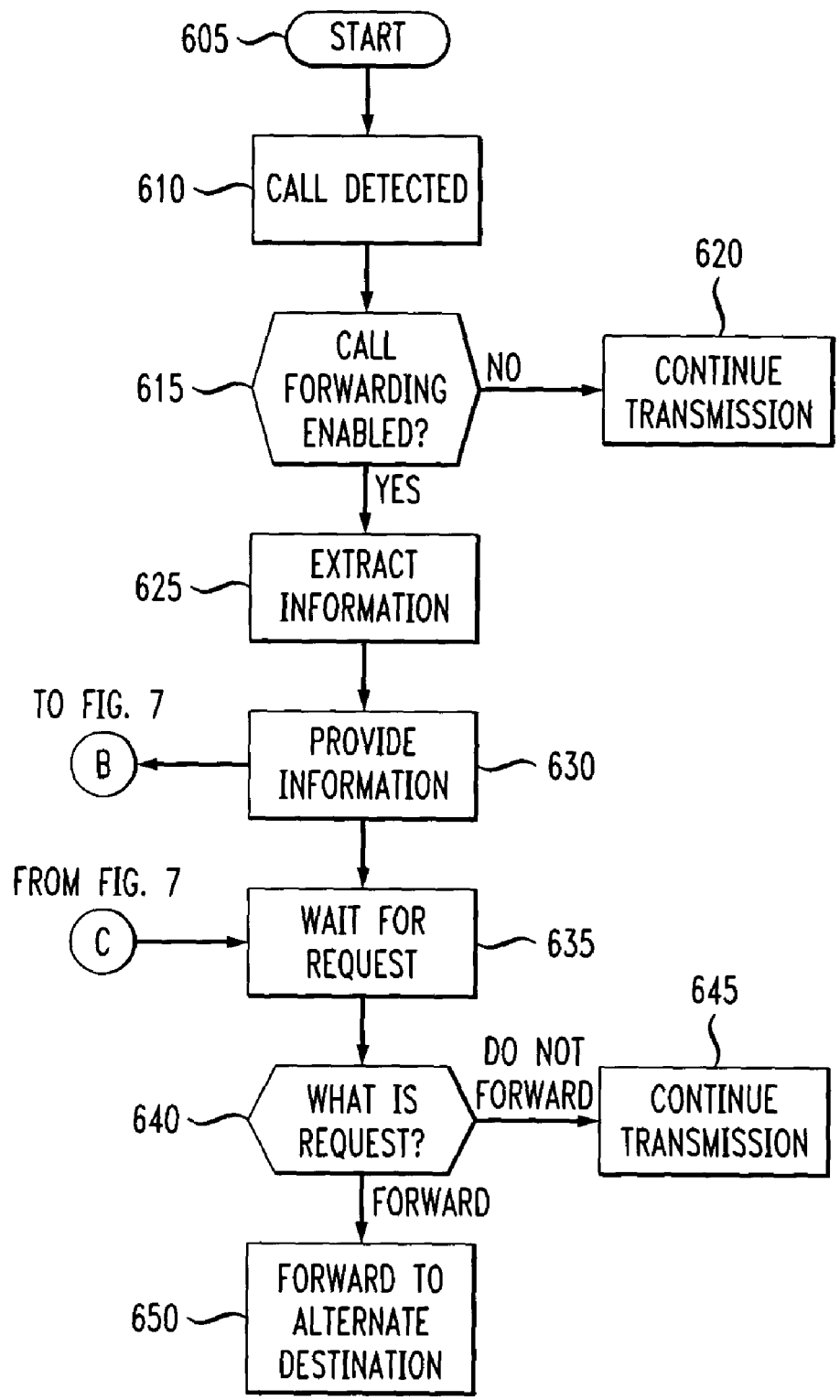
FIG. 6 illustrates a flow chart of an embodiment of a call forwarding routine according to the principles of the present invention.

Turning now to FIG. 6, illustrated is a flow chart of an embodiment of a call forwarding routine according to the principles of the present invention. The process begins at a start step 605 with an access node monitoring a packet network for incoming calls. At a call detected step 610, an incoming call is detected when data packets are received identifying the user station as the destination.

Upon detection of an incoming call, control passes to a call forwarding enabled decisional step 615 to determine if call forwarding has been enabled for the called station, i.e., user station. The determination of whether call forwarding is enabled may be accomplished by accessing a particular memory location, associated with an enable flag, to determine if the bit has been set, i.e., a logic "1". If call forwarding has not been enabled, the call forwarding routine, in a continue transmission step 620, transmits a request to the access node to continue to transmit the data packets to the user station.

However, if it is determined, at the call forwarding enabled step 615, that call forwarding is enabled, source and destination information contained in the header of the data packets are extracted, at an extract information step 625, and the data packets are placed in a buffer, typically a memory device associated with the access node, e.g., data storage device, pending a request from the call forwarding criteria routine to transmit the data packets to an alternate destination. The call forwarding routine provides the extracted source and destination information, at a provide information step 630, to the call forwarding criteria routine and control passes to a wait for request step 635, whereby the call forwarding routine waits for a request from the call forwarding criteria routine.

When a request is received by the call forwarding routine, at a what is request decisional step 640, it is determined if the request is to continue transmitting data packets to the called station or to reroute the data packets to an alternate destination. If it is determined that the request is to continue transmitting the data packets to the user station, the access node continues to transmit the data packets to the user station at a continue transmission step 645.

If it is determined, however, that the data packets are to be rerouted to an alternate destination, the call forwarding routine, at a forward to alternate destination step 650, substitutes the destination address in the header of the data packets with the alternate destination address provided by the call forwarding criteria routine. The data packets with the substituted destination address are then retransmitted over the packet network.

Figure 7:
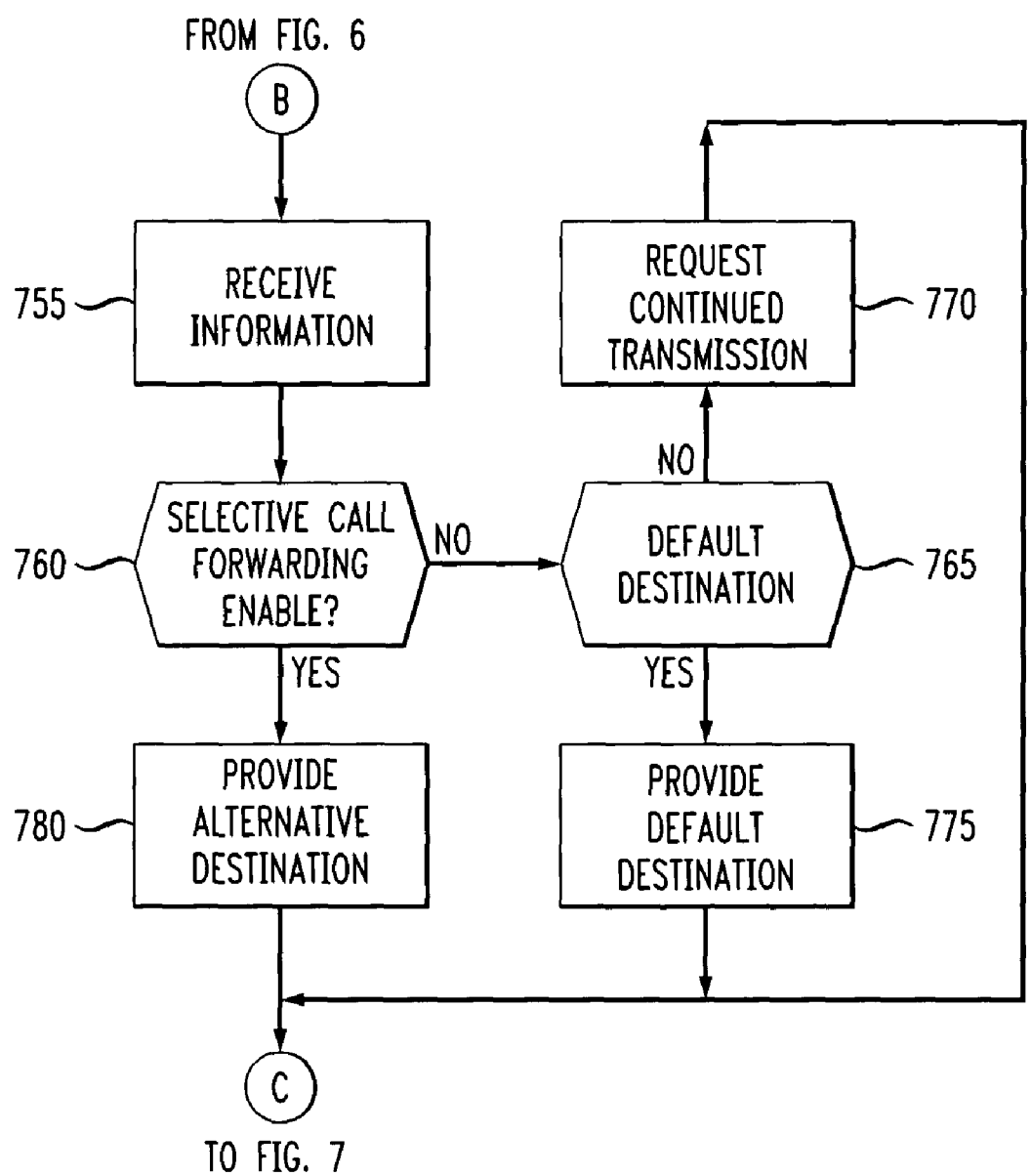
FIG. 7 illustrates a flow chart of a related embodiment of the call forwarding routine of FIG. 6.

Turning now to FIG. 7, illustrated is a flow chart of a related embodiment of the call forwarding routine of FIG. 6. The call forwarding routine is initiated at a receive information step 755, with the acceptance of the source and destination information contained in the received data packets. Control passes to a selective call forwarding enabled decisional step 760 to determine if selective call forwarding has been activated for the called station, i.e., destination, by comparing the calling station with the call forwarding criteria that has been preestablished. A call routing directory for incoming calls is configured and used in a similar way as the call blocking directory described previously. The call routing directory contains the call forwarding criteria and is defined by the station user with entries corresponding to specific sources and associated call routing control information to alternate destinations. The call routing directory may include the continuous media communication data packet source address, the continuous media communication data packet destination address, the identity of the calling party, the automatic number information (ANI) associated with the call and the identity of the called party. The call routing control information may include a time period, such as a day of week or time of day, when calls to an associated alternate destination of the call routing control information are to be accomplished, i.e., forwarded. Additionally, the alternate destination addresses may specify a endpoint that may be a second telephone, a voice mailbox, a pager or another computer.

If, at the selective call forwarding enabled step 760, it is determined that selective call routing for that particular source has not been enabled or does not exists in the call routing directory, the call forwarding routine, in a default destination decisional step 765, determines whether a default destination has been specified in the call routing directory. If no default destination has been specified, the call forwarding routine, at a request continued transmission step 770, transmits a request to the access node to continue to transmit the data packets to the user station. If a default destination has been specified, however, the call forwarding criteria routine, at a provide default destination step 775, provides the default destination address along with a request to the call forwarding routine to route the call to the destination address.

If it is determined, however, that selective call routing for that particular source is enabled, i.e., the call routing directory has a entry for the source and associated alternate destination (s), the call forwarding criteria routine, at a provide alternative destination step 780, provides the associated alternate destination address(es) along with a request to the call forwarding routine to route the call to the alternate destination address(es).

Although the present embodiment describes that the packet interception routine, call blocking routine, call forwarding routine and call forwarding criteria routine are resident in data processing and storage circuitry of the access node, the systems of the present invention are not limited to a particular device or location. The packet interception, call blocking, call forwarding and call forwarding criteria routines may also reside together in the user station or the user station's data storage device or separately at different locations.

The foregoing has outlined preferred and alternative features of the present invention so that those skilled in the art may better understand the detailed description of the invention. Those skilled in the art should appreciate that they can readily use the disclosed conception and specific embodiment as a basis for designing or modifying other structures for carrying out the same purposes of the present invention. Although the present invention has been described in detail, those skilled in the art should understand that they can make various changes, substitutions and alterations herein without departing from the spirit and scope of the invention in its broadest form.

What is claimed is:

1. A processor for use with a user communication device (UCD) that communicates over a packet network by transmitting and receiving streams of continuous media communication data packets, said processor being adapted to provide a call blocking feature for said UCD when it executes instructions to:

receive a stream of associated continuous media communication data packets relating to a potential call from a calling party to another party, wherein said potential call is an outgoing call from said UCD;

buffer said stream of associated continuous media communication data packets that is received;

access a memory associated with said processor to determine if said call blocking feature has been enabled for said UCD, wherein said call blocking feature includes selective call blocking having selective call blocking criteria that is stored by a user of said UCD and corresponds to different calling parties employing said UCD according to an identity of each of said different calling parties;

release said buffered stream for said completion of said potential call when said call blocking feature has not been enabled for said UCD;

perform a comparison of information derived from said stream with call blocking criteria from said selective call blocking criteria that corresponds to said calling party when said call blocking feature has been enabled for said UCD; and block completion of said potential call based on a result of said comparison.

2. The processor of claim 1 wherein said processor is directly connectible to said UCD.

3. The processor as recited in claim 1 wherein said processor is directly connectible to a point of presence (POP) of said packet network.

4. The processor as recited in claim 1 wherein said selective call blocking criteria includes criteria selected from the group consisting of:
   a continuous media communication data packet source address,
   a continuous media communication data packet destination address,
   an identity of a calling party,
   an identity of a called party,
   automatic number information (ANI) pertaining to said call,
   a time of day, and
   a day of week.

5. A system for use with a user communication device (UCD) that communicates over a packet network by transmitting and receiving streams of continuous media communication data packets, said system providing a call blocking feature for said UCD, comprising:
   means for receiving and buffering a stream of associated continuous media communication data packets relating to a potential call with another party, wherein said potential call is an outgoing call from said UCD;
   means for determining if said call blocking feature has been enabled for said UCD, wherein said call blocking feature includes selective call blocking having selective call blocking criteria that is stored by a user of said UCD and corresponds to different calling parties employing said UCD according to an identity of each of said different calling parties;
   means for releasing said buffered stream for completion of said potential call when said call blocking feature has not been enabled for said UCD;
   if said call blocking feature has been enabled for said UCD, means for performing a comparison of information derived from said stream with call blocking criteria from said selective call blocking criteria that corresponds to said calling party; and
   means for blocking completion of said potential call based on a result of said comparison.

6. The system as recited in claim 5 wherein said receiving means and said blocking means are directly connectible to said UCD.

7. The system as recited in claim 5 wherein said receiving means and said blocking means are directly connectible to a point of presence (POP) of said packet network.

8. The system of claim 5 wherein said selective call blocking criteria includes criteria selected from the group consisting of:
   a continuous media communication data packet source address,
   a continuous media communication data packet destination address,
   an identity of a calling party,
   an identity of a called party,
   automatic number information (AM) pertaining to said call,
   a time of day, and
   a day of week.

9. A method of providing call blocking for a user communication device (UCD) that communicates over a packet network by transmitting and receiving streams of associated continuous media communication data packets that are associated with said UCD, said method comprising the steps of:
   receiving a stream of associated continuous media communication data packets relating to a potential call with another party, wherein said potential call is an outgoing call from said UCD;
   accessing a memory associated with said processor to determine if said call blocking feature has been enabled for said UCD, wherein said call blocking feature includes selective call blocking having selective call blocking criteria that is stored by a user of said UCD and corresponds to different calling parties employing said UCD according to an identity of each of said different calling parties;
   releasing said stream for said completion of said potential call when said call blocking feature has not been enabled for said UCD;
   if said call blocking feature has been enabled for said UCD, performing a comparison of information derived from said stream with call blocking criteria from said selective call blocking criteria that corresponds to said calling party; and
   blocking completion of said potential call based on a result of said comparison.

10. The method as recited in claim 9 wherein said selective call blocking criteria includes criteria selected from the group consisting of:
    a continuous media communication data packet source address,
    a continuous media communication data packet destination address,
    an identity of a calling party,
    an identity of a called party,
    automatic number information (ANI) pertaining to said call,
    a time of day, and
    a day of week.

11. The processor as recited in claim 5 wherein said call blocking criteria is stored as a table in a data storage device associated with said processor.

12. The processor as recited in claim 11 wherein said call blocking criteria is stored in a dynamic call blocking table.

13. The processor as recited in claim 11 wherein said call blocking criteria is stored in a static call blocking table.

14. The processor as recited in claim 1 wherein said different calling parties employing said UCD are identified based on a logon procedure.

* * * * *